United States Patent [19]
Borreson

[11] 4,093,164
[45] June 6, 1978

[54] PRECAST ADJUSTABLE FOUNDATION FOR SMALL EQUIPMENT

[76] Inventor: Edgar L. Borreson, 6133 N. Newburg Ave., Chicago, Ill. 60631

[21] Appl. No.: 781,500

[22] Filed: Mar. 25, 1977

[51] Int. Cl.² ............................................. F16F 15/00
[52] U.S. Cl. .......................................... 248/20; 248/23
[58] Field of Search ............................. 248/20, 19, 23

[56] References Cited

U.S. PATENT DOCUMENTS

| | | | |
|---|---|---|---|
| 1,331,885 | 2/1920 | Tatar | 248/20 |
| 1,377,556 | 5/1921 | Bridgman | 248/20 |
| 2,707,659 | 5/1955 | Sloyan | 248/23 |
| 3,306,562 | 2/1967 | Bellefleur | 248/23 |

Primary Examiner—Robert A. Hafer

[57] ABSTRACT

A precast concrete block foundation for leveling and absorbing vibrational energy.

2 Claims, 6 Drawing Figures

PRECAST ADJUSTABLE FOUNDATION FOR SMALL EQUIPMENT

BACKGROUND OF THE INVENTION

This invention relates to precast concrete base or foundation for equipment installation, and particularly to holding down, and leveling, and absorbing the vibrational energy of such equipment.

The object of this invention is to provide a fairly easy installation of equipment upon a standardized precast concrete base. A further purpose is to have a base field-assemblable of standard precast components. Yet another purpose is to provide a base that is adjustable to the mounting dimensions of a particular piece of equipment. Another purpose is to provide a base which can be easily leveled. Still a further purpose of this invention is to change this precast foundation into an inertia base, simply by rotating the angle iron legs, and installing four spring isolators, making it into a floating base, that will dissipate vibrational energy.

DESCRIPTION OF CONSTRUCTION DETAIL

Figure 1:
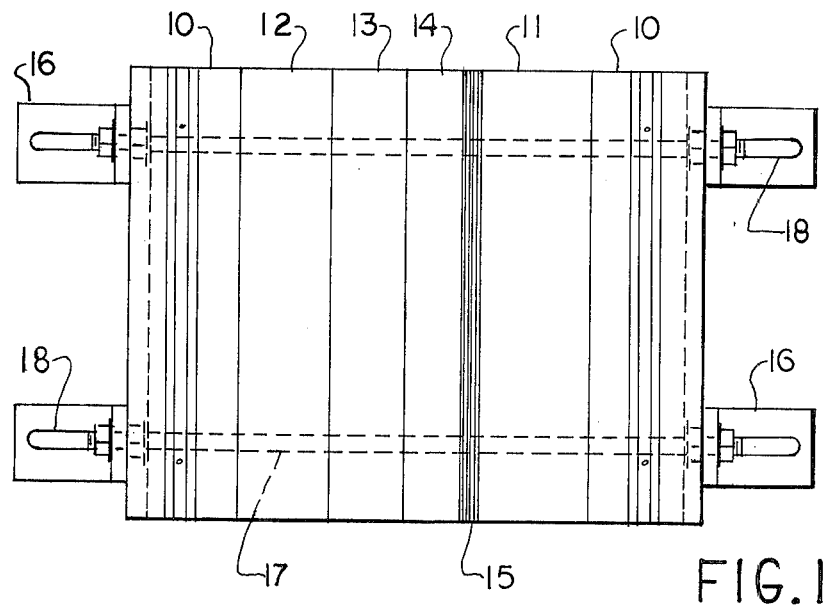
FIG. 1 is a plan view of the foundation.
Figure 2:
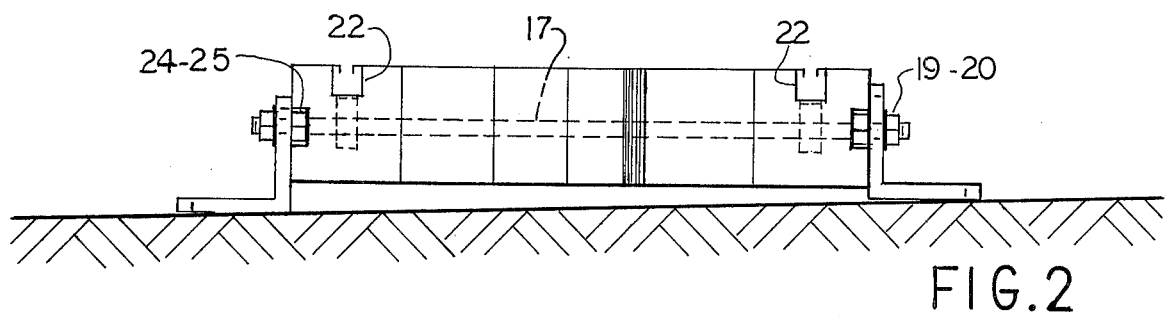
FIG. 2 is a side view of the foundation with adjustable angle iron brackets.
Figure 3:
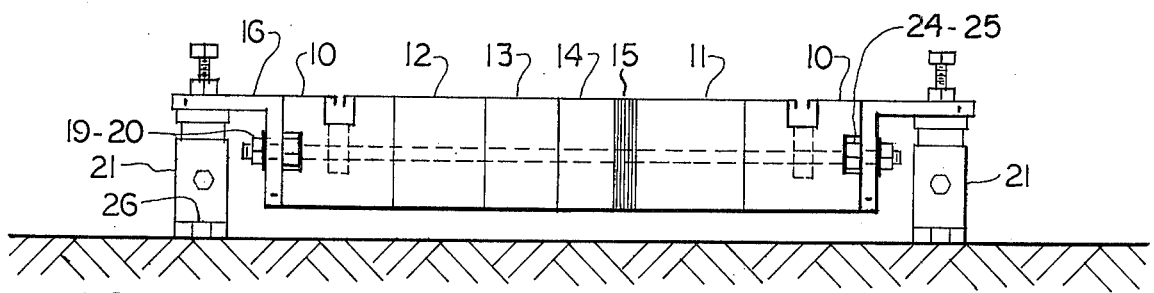
FIG. 3 is a side view of the foundation with adjustable isolators.
Figure 4:
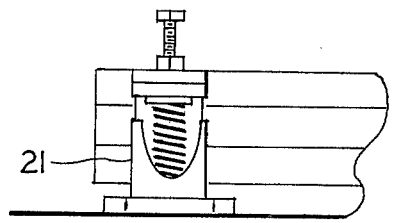
FIG. 4 is a front view of isolators.
Figure 5:
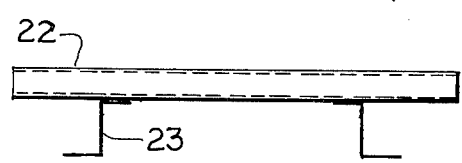
FIG. 5 is a side view of channel iron hold-down rail with anchor plates.
Figure 6:
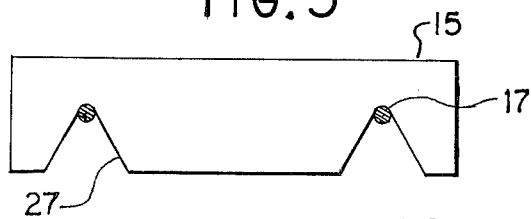
FIG. 6 is a side view of base shims.

In the drawing a precast concrete foundation or base with 14 embodying features of this invention is illustrated.

The foundation consists of 5 standardized precast concrete blocks 10, 11, 12, 13 and 14, all of which has two holes for continuous rod. The two blocks 10 and 11 will be the same width, while the other three blocks 12, 13, and 14 consecutively will be smaller in widths as shown on drawing. Two precast concrete blocks 10 are required in every base assembly, blocks 12, 13, and 14 can be assembled in any suitable number, or duplication of numbers, or in any sequence to form a foundation for a particular piece of equipment. The rod is inserted thru the holes in the blocks then together with the nuts and washers 24 and 25 for bolting together the precast blocks to constitute a precast base, and then by attaching the angle iron brackets 16 with nuts and washers 19 and 20 to form an adjustable precast concrete foundation, that can be readily attached to the floor with a concrete shell and a bolt. Concrete block 10 has two important features--a slot or recess on the side of the block the full thickness and width of the nut and washer 24 and 25; and a continuous concrete channel insert or rail 22 with a special spring nut for a quick and easy installation of equipment. The distance between the rails may be adjusted to fit a particular piece of equipment by judiciously selecting the proper number and thicknesses of concrete blocks and obtaining a finer adjustment by the use of shims, slots 27 in the shims are provided to permit the shims 15 to be placed about the rod 17. All of the brackets 16 have slots 18 to permit vertical and horizontal adjustments for leveling purposes. Still another feature of this invention, is to create an inertia precast concrete base simply by loosening nut 19 and rotating angle iron leg 16 ninety degrees simply by installing and anchoring four spring isolators 21 on flat or slopped floor as shown on drawing, would dissipate all vibrational energy of the equipment. It is also known that the many joints and interfaces between the blocks, shims, and angle iron brackets contribute further to energy absorption by surface friction at the interfaces.

The brackets, shims, rails and rods can be made of any suitable material such as steel and environmentally protected by plating and painting.

It is obvious that minor changes can be made without departing from the concept of this invention and all that fall within the reasonable scope of appended claims are claimed.

What is claimed is:

1. A precast equipment installation foundation for levelling and holding down of equipment having particular base dimensions and absorption of equipment vibration, comprising two precast concrete end blocks of substantially the same standardized width, each of said end blocks being provided with at least two aligned compression rod holes, and each of said blocks being provided with a continuous channel insert rail on its equipment-mounting face for mounting of equipment, a plurality of precast concrete blocks of different, standardized widths, positioned between said end blocks, each of said plurality of intermediate blocks being provided with at least two aligned compression rod holes aligned with the holes of said end blocks, and having widths selected to provide a distance between said channel rails approximating the equipment base dimensions, a plurality of shims having slots aligned with said compression rod holes for fine adjustment of the distance between the channel rails to the equipment mounting dimension, at least two compression rods and bolts positioned through said compression rod holes to hold said end blocks, shims and intermediate blocks in compressive relationship, and at least four angle-iron legs mounted to said end blocks by means of said compression rods and at each respective end thereof, said angle-iron legs being provided with mounting slots for individual height adjustment of each leg to provide for levelling capability for the compression-loaded foundation assembly.

2. A foundation in accordance with claim 1 further comprising at least four spring isolators respectively mounted on each of said four angle-iron legs.